United States Patent [19]

Tweedy

[11] Patent Number: 4,899,986

[45] Date of Patent: Feb. 13, 1990

[54] ROTARY HOIST

[76] Inventor: James E. Tweedy, 419 NW. 53rd, Lawton, Okla. 73505

[21] Appl. No.: 285,628

[22] Filed: Dec. 16, 1988

[51] Int. Cl.[4] .................................... B60D 1/48

[52] U.S. Cl. .................................... 254/8 B; 254/124; 254/134

[58] Field of Search ............... 254/124, 102, 8 B, 8 R, 254/2 R, 133 R, 134; 269/17

[56] References Cited

U.S. PATENT DOCUMENTS

| | | | |
|---|---|---|---|
| 3,326,340 | 6/1967 | Popper | 254/102 |
| 4,021,017 | 5/1977 | Adams | 254/124 |
| 4,181,290 | 1/1980 | Affolter | 254/124 |
| 4,508,233 | 4/1985 | Helms | 254/124 |
| 4,669,703 | 6/1987 | Hawkins et al. | 254/124 |

OTHER PUBLICATIONS

BlueBird brochure, BlueBird International, Englewood, Colo., Jun. 1986.

J. C. Whitney & Co., Auto Parts and Accessories, Catalog No. 495K, Chicago, Ill., undated, p. 157.

*Primary Examiner*—Judy Hartman

*Attorney, Agent, or Firm*—Dunlap, Codding, Peterson & Lee

[57] ABSTRACT

A rotary hoist generally comprising a vertically extending shaft, a tubular housing telescoped over and rotatably supported on the shaft, a boom pivotally secured to the tubular housing and a jack pivotally secured between the housing and the boom. The shaft is supported by a leg socket member with elongated legs. The rotary hoist may be disassembled for storage or shipping.

14 Claims, 3 Drawing Sheets

ROTARY HOIST

FIELD OF THE INVENTION

This invention relates to improvements in hoists, and particularly rotary hoists.

SUMMARY OF THE INVENTION

The present invention comprises a generally vertically extending shaft, a tubular housing telescoped over and rotatably supported on the shaft, a boom pivotally secured at one end thereof to the housing adjacent the upper end of the housing; and a jack having one end pivotally secured to the housing below the connection of the boom to the housing and having its opposite end pivotally secured to an intermediate portion of the boom for raising and lowering the boom. The rotary hoist can be disassembled for storage or shipping.

DETAILED DESCRIPTION OF THE DRAWINGS

Figure 1:
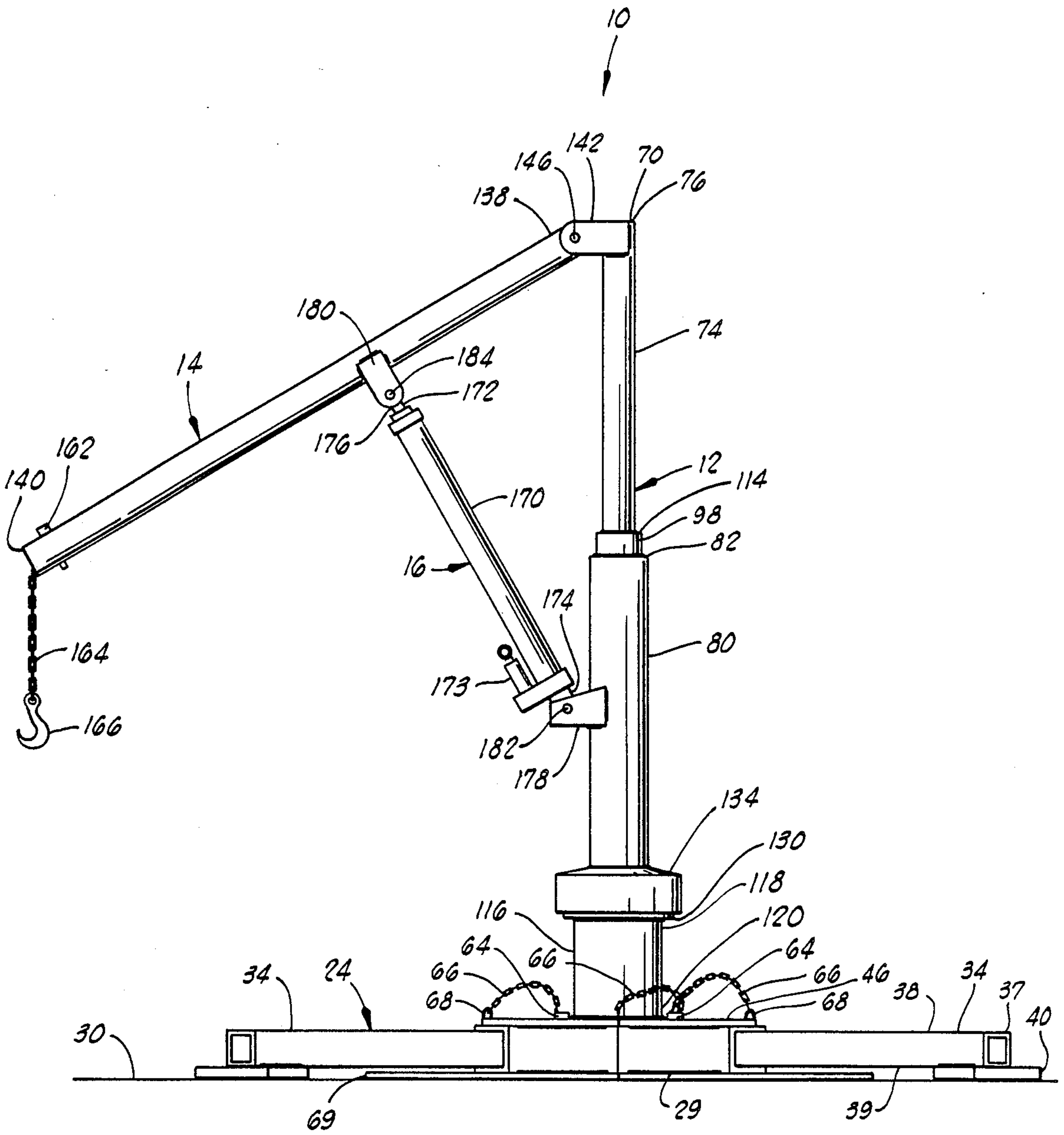
FIG. 1 is an elevational side view of the rotary hoist.
Figure 5:
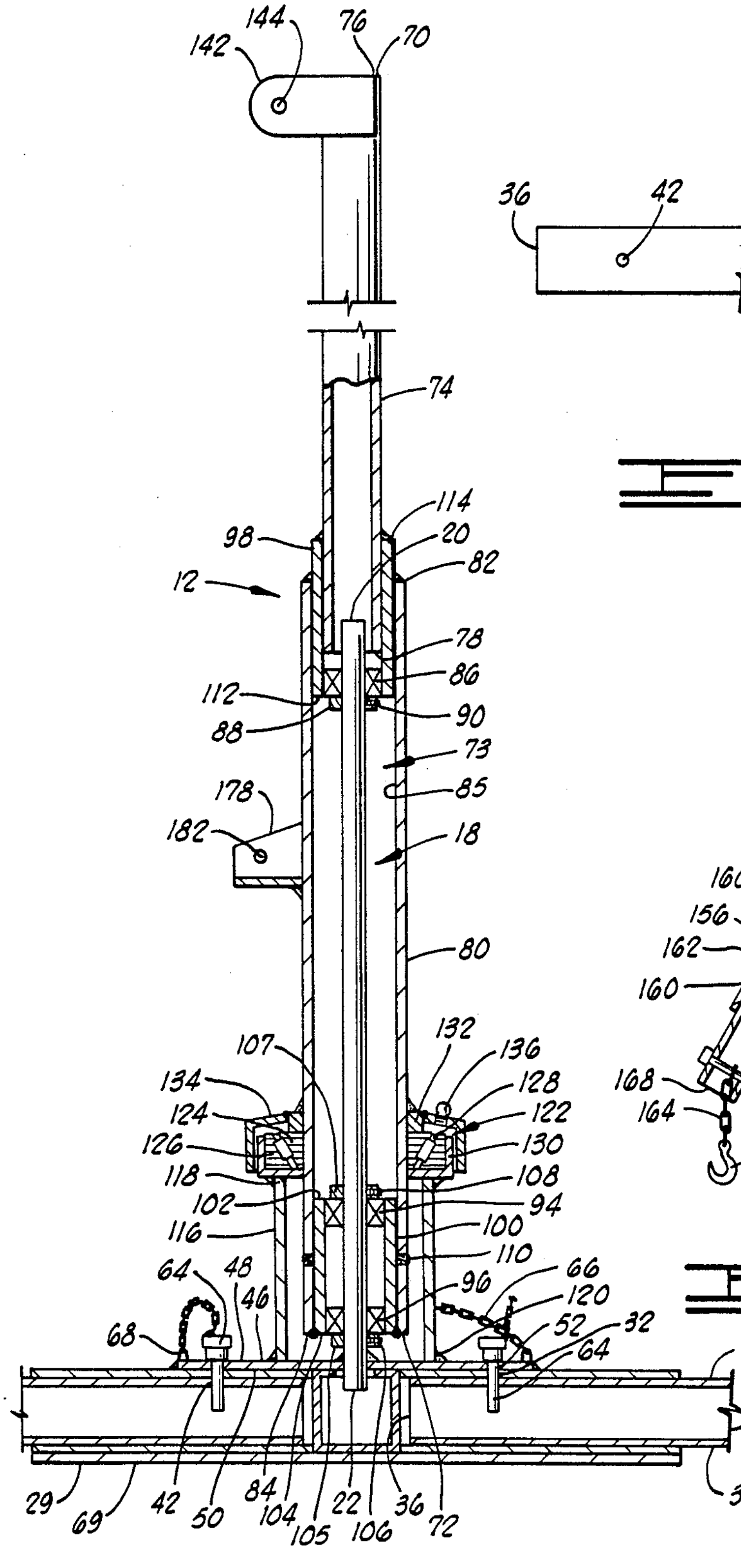
FIG. 5 is side elevational view of the tubular housing and a portion of the leg socket member with a portion thereof in cross-section.

Referring to the drawings in detail and particularly FIG. 1, the rotary hoist of this invention, generally designated by the numeral 10, comprises a tubular housing 12, a boom 14 pivotally secured at one end thereof to the housing 12, and a jack 16 pivotally secured between the housing 12 and the boom 14. As shown in FIG. 5, the tubular housing 12 is rotatably supported on a shaft 18, as described more fully hereafter.

Figure 3:
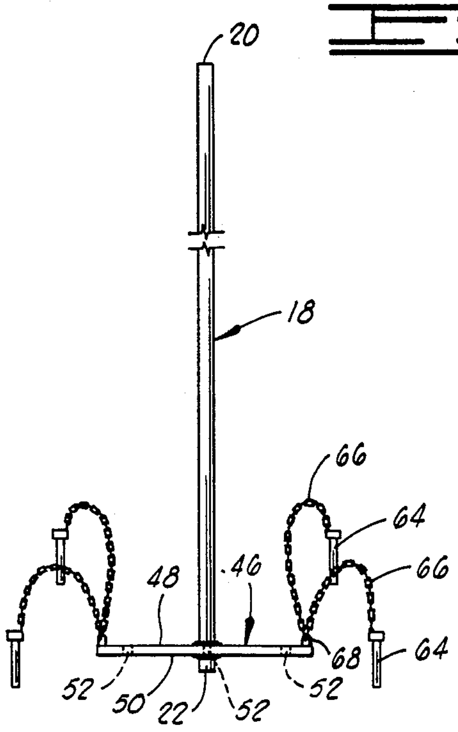
FIG. 3 is a side elevational view of the shaft and the shaft plate.

As shown in FIG. 3, the shaft 18 is in a generally vertical position having an upper end 20 and a lower end 22. The shaft may be of any diameter and length which is capable of rotatably supporting the tubular housing, as more fully described hereafter. In a preferred embodiment, the shaft is cold rolled solid steel $30\frac{1}{2}$ inches long and $1\frac{1}{4}$ inches in diameter.

Figure 4:
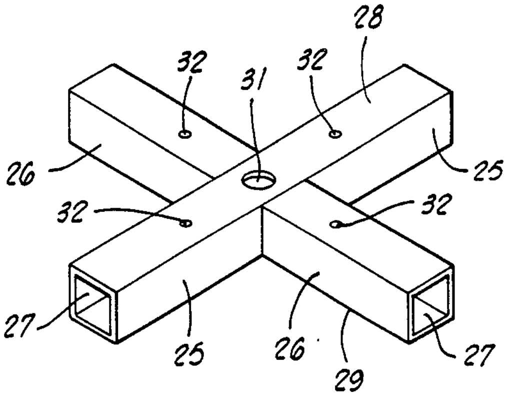
FIG. 4 is a perspective view of a portion of the leg socket member.

The shaft is secured to a leg socket member 24. A portion of the leg socket member shown in FIG. 4 comprises leg sockets 25 and 26 secured in crossing relationship at right angles to each other forming sockets 27 at each end thereof. The secured leg sockets 25 and 26 have a flattened top surface 28 and a flattened bottom surface 29 which supportingly contacts a support surface such as a floor or the ground 30. The top surface 28 of the leg sockets has a shaft opening 31 and bolt apertures 32, as described hereafter. Squared steel tubing is a suitable material for the leg sockets.

Figure 2:
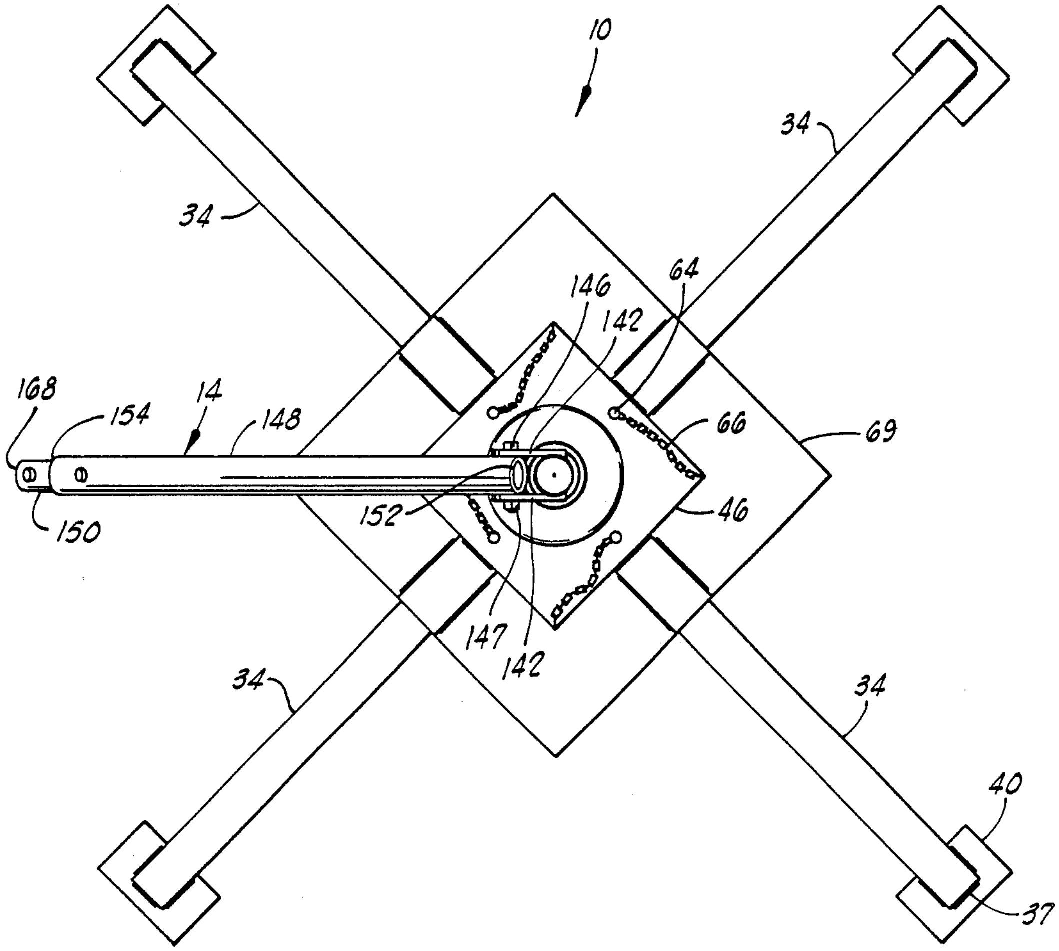
FIG. 2 is a top plan view of the rotary hoist.

A leg 34 extends from each socket to provide a foundational support as shown in FIG. 2. Each leg is sufficiently elongated to contact a sufficient amount of the support surface so that the rotary hoist is stable and will not tip over while in operation. Although various lengths of the legs may be utilized in accordance with the present invention, having each leg twice as long as the tubular housing 12 has proved effective in providing stability in the present invention while hoisting a weighted object such as an automobile engine.

Figure 6:
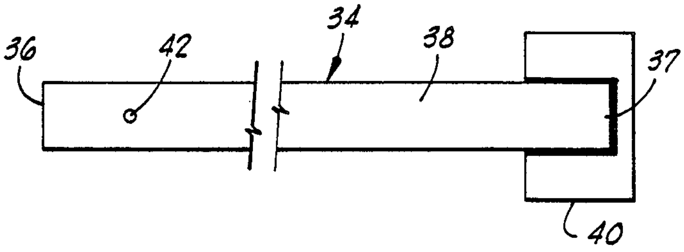
FIG. 6 is a top plan view of a leg.

As shown in FIGS. 5 and 6, each leg 34 has a first end 36 secured in a socket 27, a second end 37, an upper face 38 and a lower face 39. The second end 37 of each leg is secured to a leg plate 40 interposed between the lower face 39 of the leg and the support surface 30 as shown in FIG. 1. The leg plate 40 contacts a larger area of the support surface than the second end of the leg thereby promoting further stability to the rotary hoist. Each leg 34 has an aperture 42 for securing the leg 34 in a respective socket 27 as described hereafter. Each leg is constructed from squared steel tubing having an outside diameter slightly smaller than the inside diameter of the squared steel tubing forming the sockets. The legs may be welded to the leg socket member or removably secured as discussed hereafter.

The leg socket member 24 further includes a square shaft plate 46 (FIG. 3) having an upper surface 48 and a lower surface 50, a shaft aperture (not shown) and bolt apertures 52. The shaft plate also includes leg socket bolts 64 secured to chain 66 which is attached to the leg socket member 24 by putting a U bolt 68 through one end of the chain and welding the U bolt 68 to the shaft plate 46. The other end of the chain is secured to the leg socket bolt. This may be accomplished by slipping the free end of the chain through an eye of the leg socket bolt (not shown) and crimping the chain around the bolt. By attaching the bolts to the leg socket member in this manner, the bolts will not be lost during storage or shipment.

The shaft plate 46 is secured on the shaft 18 a short distance above the lower end 22 of the shaft. The shaft is welded to the upper surface 48 and the lower surface 50 of the shaft plate 46. The lower end 22 of the shaft fits in the aperture 31 (FIG. 4) in the upper surface 28 of the leg socket with the shaft plate 46 contacting the upper surface 28 of the leg sockets. The shaft plate 46 is welded to the upper surface 28 of the leg sockets.

A square base plate 69 (FIG. 2) is disposed between the bottom surface 29 of the leg sockets and the support surface 30 to further stabilize the rotary hoist. The base plate 69 is welded to the bottom surface 29 of the leg sockets.

As previously described, the legs 34 may be removably secured in the receiving sockets 27 so that the leg socket member 24 may be dismantled for storage or shipping. Bolt apertures 32 in the upper surface 28 of the leg sockets, bolt apertures 52 in the shaft plate and leg aperture 42 in each leg are positioned so that when the first end 36 of each leg is inserted into the respective socket 27, apertures 32, 42 and 52 are aligned. Leg socket bolts 54 are placed into the apertures 32, 42, and 52 thereby securing the legs 34 in the sockets 27. When the legs are to be removed, the leg socket bolts 54 are removed and the legs withdrawn from the sockets.

As previously described, the tubular housing 12 is supported on the shaft 18. The tubular housing 12 has an upper end 70 and a lower end 72 with a housing cavity 73 throughout at least a portion thereof. The housing cavity 73 is sized to receive the shaft 18 and the bearings disposed thereon, as described hereafter. As shown in FIG. 5, the tubular housing 12 comprises a tubular upper housing section 74 having an upper end 76 and a lower end 78, and a tubular lower housing section 80 having an upper end 82 and a lower end 84. In a preferred embodiment, the upper housing section is double strength steel tubing and the lower housing section is steel tubing.

The tubular housing is rotatably supported on the shaft by three bearings secured between the inside wall of the tubular housing 85 and the shaft 18. The bearings work in the conventional way: a stationary race (not shown) contacts the stationary surface, the shaft 18, and the turning race (not shown) contacts the surface to be rotated, the inside wall of the tubular housing 85. Bearings are disposed between the races. A bearing used in accordance with the present invention is a ring-shaped sealed bearing commercially available from Peer Bearing, Wheeting, Ill., model #A1S206-31 75, which slides over the shaft, and is supported on the shaft 18 by a bearing lock ring as described hereafter.

A first bearing 86 is positioned on the upper end portion of the shaft 18 and a pair of vertically spaced bearings 94 and 96 are positioned on lower end portion of the shaft 18 above the shaft plate 46. As shown in FIG. 5, an upper tubular bearing collar 98 and a lower tubular bearing collar 100 are interposed between the bearings and the inside wall 85 of the tubular housing.

Bearing 94 is secured in the upper end 102 of the lower bearing collar, and bearing 96 is secured in the lower end 104 of a lower bearing collar. The bearings are about flush with the ends of the collar. The lower collar assembly, comprising the collar 100 holding bearings 94 and 96, is supported on the shaft 18 between lower bearing lock ring 105 and middle bearing lock ring 107.

Bearing 86 is secured in the lower end 112 of the upper bearing collar 98. The upper bearing assembly, comprising the collar 98 and bearing 86, is supported on the shaft 18 by lock ring 88.

Lock rings 88, 105 and 107 are steel rings having respective set screws 90, 106 and 108 (FIG. 5) positioned adjacent to the bearing to support and restrain the movement thereof. When the set screws are tightened, the distal end of the screw protrudes into the aperture created by the ring. The lock rings are slid over the shaft to the proper position. Holes drilled in the shaft (not shown) at the selected positions receive the distal end of set screws 90, 106 and 10 thereby securing the lock rings to the shaft.

The lower housing section 80 is positioned over the lower end 112 of the upper bearing collar and over the lower bearing collar 100 so that the lower end 84 of the lower housing section is about flush with the lower end 104 of the lower bearing collar. Plug welds 110 secure the lower housing section 80 to the lower bearing collar 100. During construction, the upper bearing collar 98 can be positioned on the shaft 18 after the lower housing section 80 has been secured.

As shown in FIG. 5, the upper end 82 of the lower housing section is welded to the lower end 112 portion of the upper bearing collar. The upper end 114 of the upper bearing collar extends a distance from the upper end 82 of the lower housing section, and receives the lower end 78 of the upper housing section therein. The lower end 78 of the upper housing section is welded to the upper end 114 of the upper bearing collar. During construction, the upper housing section can be secured to the upper bearing collar 98 after the tubular support section and thrust bearing assembly have been positioned.

A tubular support section 116 having a upper end 118 and a lower end 120, is telescoped over the tubular housing 12. The support section 116 encases the lower portion of the tubular housing and serves to support the thrust bearing assembly 122.

The thrust bearing assembly 122 has a turning race 124 and a stationary race 126, with bearings 128 therebetween, interposed between the support section 116 and the tubular housing 12. The turning race 124 engages the rotatable tubular housing 12 and the stationary race 126 engages the stationary support section 116. Commercially available thrust bearings and races may be used such as Bower Bearing #593A and Bower Bearing Race #592A from Peer Bearing, Wheeting, Ill.

A support collar 130 is secured to the upper end 118 of the support section securingly engaging the stationary race 126 and holding the thrust bearing assembly 122. In order to keep the thrust bearing assembly in place, a retaining ring 132 is positioned over the thrust bearing assembly 122 and secured to the tubular housing 12 by welding. The lower end 120 of the support section is welded to the shaft plate 46.

A dust cover 134 is secured to the retaining ring 132 to prevent unwanted material from depositing on the thrust bearing assembly. The dust cover comprises a cap-like ring which substantially covers the thrust bearing assembly and includes a grease opening 136 suitable for supplying grease to the thrust bearing assembly. The nose of a conventional grease gun is inserted in the grease opening and grease injected therein to provide needed lubrication for the thrust bearing.

The combination of the thrust bearing assembly and the support section serves to transfer a portion of the weight from the tubular housing to the support section and the leg socket member. The thrust bearing assembly in combination with the bearings supported on the shaft serve to provide an easily rotatable tubular housing.

As shown in FIG. 1, the boom, having an upper end 138 and a lower end 140, is pivotally attached to the upper end 70 of the tubular housing so that as the boom pivots away from the tubular housing 12, the lower end of the boom 140 is elevated. The boom 14 is secured to the upper end of the tubular housing 70 by a pair of ears 142 welded to the upper end of the tubular housing 70 having aligned bolt apertures (not shown) therethrough. When the upper end of the boom 138, having a bolt aperture (not shown), is positioned between the ears 142, the apertures in the boom and the ears align so that a bolt 146 may pass therethrough and be secured with a nut 147 thereby pivotally securing the boom to the tubular housing. The nut and bolt may be removed thereby permitting disassembly of the boom from the tubular housing for shipping or storage.

Figure 7:
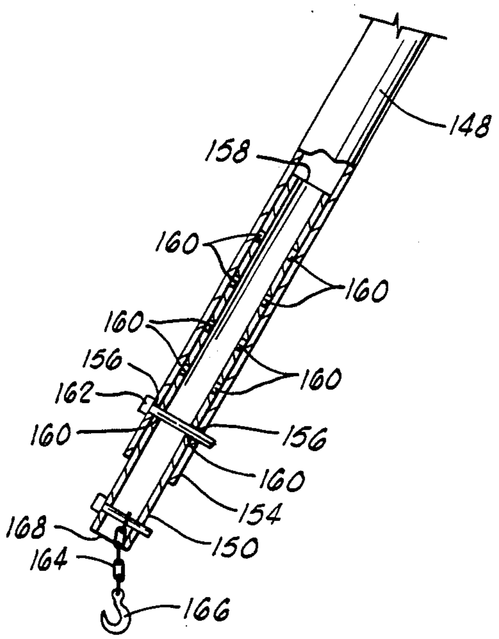
FIG. 7 is a side elevational view of the boom showing a portion thereof in cross-section.

In the event an adjustable boom is required, a boom can be constructed (FIGS. 2 and 7) comprising a tubular first boom member 148 and a tubular second boom member 150 telescoped into the first boom member. The upper end 152 of the first boom member is secured to the tubular housing as previously described. As shown in FIG. 7, a bolt aperture 156 is positioned between the upper end 152 and the lower end 154 of the first boom member. The second boom member 150 has a plurality of bolt apertures 160 therethrough which selectively align with aperture 156 on the lower end 154 on the first boom member as the second boom member 150 is positioned therein; a removable bolt 162 is inserted in the aligned apertures to secure the second boom member 150 to the first boom member 148.

The lower end 140 of the boom (FIG. 1) and the lower end 168 of the adjustable boom (FIG. 7) are adapted to receive a weighted object by fastening a chain 164 with a hook 166 thereto. The object to be hoisted may be wrapped in a chain which is received by the hook.

In order to elevate the boom, a hydraulic jack 16 is positioned between the tubular housing 12 and the boom 14, as shown in FIG. 1. The jack is a conventional hydraulic jack such as a three ton, longneck jack model #LRJ3 made by Sunex International in Taiwan, comprising a hydraulic cylinder 170 containing a piston (not shown) connected to a piston rod 172 which extends from the cylinder upon activation of the jack. The jack is activated in the conventional manner by pumping a jack handle 173 which pressurizes the fluid in the cylinder thereby pushing the piston rod from the cylinder.

The lower end 174 of the jack 16 is pivotally secured to the tubular housing 12 below the connection of the boom to the housing, and the upper end 176 of the jack is pivotally secured to an intermediate portion of the boom. A jack-housing mount 178 comprising paired projections capable of receiving end 174 of jack 16 therebetween is welded to the lower housing section 80. The jack-housing mount 178, one side of which is shown in FIG. 1, and the end 174 of the jack have bolt apertures (not shown) aligned to receive a bolt 182 therethrough. The end 174 of the jack 16 is placed between the bolt apertures on the jack-housing mount 178 so that the bolt apertures of the mount and the jack align and bolt 182 is inserted therein thereby pivotally securing the end of the jack 174. A nut (not shown) threadingly engages the distal end of bolt 182. The nut and the bolt may be removed for disassembly. A jack-boom mount 180 comprising paired projections having aligned bolt apertures, one of which is shown in FIG. 1, is welded to the first boom member 148 which secures end 176 of jack 16 in the same manner as the jack-housing mount 178.

In operation, the rotary hoist is positioned near the object to be hoisted. The boom 14 is adjusted to the proper length to secure the object to be hoisted by selectively positioning and securing the second boom member 150 in the first boom member 148. The hook 166 at the end of the boom secures an object to be hoisted such as an automobile engine. The hydraulic jack 16 is activated by pumping the jack handle 173 thus extending the piston rod 172 from the jack cylinder 170 and elevating the lower end 140 of the boom with the object secured thereto. The hoisted object may be placed in any position in a 360° radius from the original hoisting point by pushing the boom. The object is selectively lowered by releasing the hydraulic pressure in the hydraulic jack. The present invention may be disassembled for storage by removing the bolts securing the jack, the boom to the housing, the boom members and the legs and disassembling same.

Changes may be made in the combination and arrangement of parts or elements as heretofore set forth without departing from the spirit and scope of the invention as defined in the following claims.

What I claim is:

1. A rotary hoist for hoisting an object, comprising:

a generally vertically extending stationary guide shaft having an upper end and a lower end said lower end being attached to a base;

an outer tubular housing rotatably supported on the shaft, the outer tubular housing having an upper end and a lower end;

an inner tubular housing having an upper end and a lower end, the inner tubular housing lower end being telescopingly and rotatably received within the outer tubular housing upper end, the inner tubular housing being rotatably and slideably mounted along said shaft, a boom pivotally secured at one end thereof to the inner tubular housing adjacent the upper end of the inner tubular housing, wherein the boom is capable of securing the object to be hoisted;

a jack having one end pivotally secured to the outer tubular housing below the connection of the boom to the inner tubular housing and having its opposite end pivotally secured to an intermediate portion of the boom for raising and lowering the boom, wherein the inner tubular housing with the boom secured thereto is capable of 360 degree rotation about the shaft while the object is secured to the boom.

2. The rotary hoist of claim 1 characterized further to include:

as stationary tubular support section telescoped over the lower end of the outer tubular housing and supporting the outer tubular housing, the support section having an upper end and a lower end.

3. The rotary hoist of claim 2 characterized further to include:

a thrust bearing having a turning race and a stationary race, interposed between the support section and the outer tubular housing wherein the turning race engages the outer tubular housing and the stationary race engages the support section and wherein the thrust bearing and the support section are capable of transferring at least a portion of the weight of the outer tubular housing to the support section.

4. The rotary hoist of claim 3 characterized further to include:

a support collar mounted on the upper end of the support section holding the thrust bearing stationary race.

5. The rotary hoist of claim 2 characterized further to include:

a plurality of bearings secured between the shaft and the inner and outer tubular housing whereby the inner end outer tubular housing are rotatably supported on the shaft.

6. The rotary hoist of claim 5 wherein the bearings comprise a first bearing positioned between the upper end portion of the shaft and the inner tubular housing, and a pair of vertically spaced bearings between the lower end portion of the shaft and the outer tubular housing.

7. The rotary hoist of claim 6 characterized further to include:

an upper bearing collar positioned between the first bearing and the inner housing, and a lower bearing collar positioned between the pair of vertically spaced bearings and the outer tubular housing.

8. The rotary hoist of claim 6 wherein the tubular housing further comprises:

a lower housing section having an upper end and a lower end; and a bearing unit collar fixedly secured within the outer housing section, upper end fixedly receiving the lower end the inner housing section lower end and containing the first bearing.

9. The rotary hoist of claim 1 characterized further to include a leg socket member comprising:

leg sockets having an upper surface fixedly securing the lower end of the shaft, a lower surface supportingly contacting a support surface, and a plurality of sockets between the upper surface and the lower surface; and a plurality of elongated legs, a leg comprising a first end and a second end, wherein the first end is secured in each socket and the second end extends therefrom supportingly contacting the support surface thereby stabilizing the rotary hoist.

10. The rotary hoist of claim 9 wherein the leg socket member is further characterized to include:

a plate secured to the upper surface the leg sockets fixedly securing the lower end of the shaft.

11. The rotary hoist of claim 9 wherein the leg socket member is further characterized to include:

a stabilizing plate secured to the lower face of the leg sockets and interposed between the support surface the leg socket member.

12. The rotary hoist of claim 9 wherein the plurality of leg sockets comprise four sockets, and the plurality of legs comprise four legs.

13. The rotary hoist of claim 9 wherein securing a leg in a socket comprises:

the leg socket member and the first end of each leg having bolt apertures positioned to align to form a bolt channel therethrough; and a removable bolt inserted in the bolt channel thereby removably securing a leg in a socket.

14. The rotary hoist of claim 1 wherein the boom comprises:

a first boom member having an upper end and a lower end, the upper end pivotally secured to the inner tubular housing; and a second boom member telescoped into and removably secured in the first boom member.

* * * * *

UNITED STATES PATENT AND TRADEMARK OFFICE

CERTIFICATE OF CORRECTION

PATENT NO. : 4,899,986

DATED : February 13, 1990

INVENTOR(S) : James E. Tweedy

It is certified that error appears in the above-identified patent and that said Letters Patent is hereby corrected as shown below:

Col. 3, Line 44, please delete the number "10" and substitute therefor the number -- 108 --.

Signed and Sealed this

Fourth Day of December, 1990

*Attest:*

HARRY F. MANBECK, JR.

*Attesting Officer*

*Commissioner of Patents and Trademarks*